United States Patent
Roos et al.

(10) Patent No.: US 8,434,541 B2
(45) Date of Patent: May 7, 2013

(54) PRESSING MODULE FOR IMPREGNATED CONDUCTOR BARS OF LARGE ELECTRICAL MACHINES AND PRESSING APPARATUS EQUIPPED THEREWITH

(75) Inventors: Sascha Roos, Wettingen (CH); Matthias Schmid, Birmenstorf (CH); Michael Frei, Rombach (CH); Martin Emanuel Sicker, Gebenstorf (CH); Thomas Kamber, Basel (CH)

(73) Assignee: ALSTOM Hydro France, Levallois-Perret (FR)

( * ) Notice: Subject to any disclaimer, the term of this patent is extended or adjusted under 35 U.S.C. 154(b) by 266 days.

(21) Appl. No.: 13/094,993

(22) Filed: Apr. 27, 2011

(65) Prior Publication Data
US 2011/0315026 A1    Dec. 29, 2011

(30) Foreign Application Priority Data

May 10, 2010   (DE) .......................... 10 2010 020 100
Feb. 18, 2011   (DE) .......................... 10 2011 011 556

(51) Int. Cl.
*B32B 37/00*    (2006.01)

(52) U.S. Cl.
USPC ........................................ 156/581; 156/580

(58) Field of Classification Search ................. 156/228, 156/580, 581, 583.1; 100/315, 324
See application file for complete search history.

(56) References Cited

U.S. PATENT DOCUMENTS

| 1,474,882 | A | 11/1923 | Baumgarten | |
| 2,975,088 | A | 3/1961 | Rossman et al. | |
| 3,431,639 | A | 3/1969 | Reimer et al. | |
| 4,547,255 | A | * | 10/1985 | Yow ............................. 156/580 |
| 7,886,801 | B2 | * | 2/2011 | Nikumb et al. ............... 156/581 |
| 7,984,742 | B2 | * | 7/2011 | Shackelford ................. 156/581 |

FOREIGN PATENT DOCUMENTS

| DE | 1000501 | 1/1957 |
| DE | 2823684 | 12/1978 |
| EP | 1801457 | 6/2007 |
| GB | 849913 | 9/1960 |

OTHER PUBLICATIONS

Search Report for German Patent App. No. 10 2011 011 556.0 (Nov. 18, 2011).
Search Report for Swiss Patent App. No. 00404/11 (Jun. 9, 2011).

* cited by examiner

*Primary Examiner* — James Sells
(74) *Attorney, Agent, or Firm* — Cermak Nakajima LLP; Adam J. Cermak

(57) ABSTRACT

A pressing module for the press-forming and curing of impregnated conductor bars for large electrical machines, such as for example hydro generators, can be distinguished by an improved closing system for applying the pressing pressure, and a pressing apparatus equipped therewith, the handling of which involves significantly reduced work. A pressing module (1) has a pressing vat (2) for applying a horizontal pressing force and a pressing yoke (3) for applying a vertical pressing force. The closing units (6) and (7) for applying the horizontal and vertical pressing forces have a housing (20), which receives, slidingly mounted therein, a pressing piston (21), which is in operative connection with an axially fixed, rotatable threaded bolt (27) in such a way that a turning movement of the threaded bolt (27) brings about an axial movement of the pressing piston (21). An axial bearing (3), supported on a spring assembly (35), provides a flexible mounting of the pressing piston (21). The threaded bolt (27) protrudes on the rear side of the housing (20) and is provided there with a contour (36) for receiving a tool, for example a pneumatic screwdriver.

24 Claims, 5 Drawing Sheets

PRESSING MODULE FOR IMPREGNATED CONDUCTOR BARS OF LARGE ELECTRICAL MACHINES AND PRESSING APPARATUS EQUIPPED THEREWITH

This application claims priority under 35 U.S.C. §119 to German App. Nos. 10 2010 020 100.6 and 10 2011 011 556.0, filed 10 May 2010 and 18 Feb. 2011, respectively, the entireties of which are incorporated by reference herein.

BACKGROUND

1. Field of Endeavor

The present invention relates to a pressing module for the press-forming and curing of impregnated conductor bars for large electrical machines, such as for example hydro generators, which includes an improved closing system for applying the pressing pressure, and further relates to a pressing apparatus equipped therewith.

2. Brief Description of the Related Art

It is known to wrap the conductor bars of large electrical machines with an insulating material, in particular a mica tape, and subsequently impregnate it with a curable resin. For the purpose of curing, the conductor bars treated in this way are placed in a pressing apparatus, in which they are pressed to the desired geometry. The pressing apparatus has a number of modules, formed of horizontal and vertical pressing units, which press the impregnated conductor bars into the required form.

In order to compensate for the volume shrinkage occurring during the curing, the pressing units must be continually readjusted, in order to avoid the occurrence of air pockets within the insulation, since air pockets would make the conductor bars unusable.

This object is achieved according to the prior art by wedges that are driven between the frame and the ram of the press, often manually by means of copper hammers. In the case of relatively large apparatuses, from time to time intermediate pieces are inserted between the wedge and the ram in order to compensate for major differences in length.

This work entails considerable personnel involvement and is therefore very costly and time-consuming.

In the case of this method, setting the varying pressing forces to be applied is very difficult to accomplish and is entirely dependent on the experience of the personnel concerned with carrying it out.

Furthermore, there is the latent risk that metal parts which splinter off during hammering may strike the insulation of the conductor bars and thereby cause damage to them. This can also lead to the finished conductor bars becoming unusable, or at least require them to undergo laborious reworking.

SUMMARY

One of numerous aspects of the present invention includes a pressing module for a pressing apparatus for the curing of impregnated conductor bars for large electrical machines to the extent that the aforementioned disadvantages can be avoided, by completely abandoning the use of wedges for applying the necessary pressing forces. In this case, the components used must be able to withstand the tough conditions of operational use.

Another aspect includes a pressing module of the aforementioned type with new horizontally and vertically acting closing units, the movable components of which are largely isolated from the effects of contaminating impregnating resins.

In order to ensure this, the closing units include a housing which is fixedly connected to the respective supporting structure and receives a slidingly mounted pressing piston, which is in operative connection with an axially resiliently mounted, rotatable threaded bolt within the housing, so that a turning movement of the threaded bolt brings about an axial movement of the pressing piston.

A closing unit of such a design allows complete abandonment of the use of wedges for applying the pressing forces, while avoiding the aforementioned disadvantages. In addition, closing units of such a construction make it possible to use torque meters to apply defined pressing forces.

Yet another aspect includes mounting the threaded bolt, and consequently the pressing piston, resiliently in the axial direction. As a result, loading peaks can be absorbed and the risk of irregular pressure exertion on the conductor bars can also be mitigated.

Another aspect includes the bush of an axial bearing that introduces the force to be applied by the pressing piston into the housing being flexibly mounted, for example on a cup spring assembly. The cup spring assembly gives the closing system a certain flexibility, so that it flexibly yields to any major expansions when the impregnated conductor bar has settled. In this way it can be ensured that, even when there is greater shrinkage of the conductor bars than expected, or belated readjustment of the closing unit, a compressive force is nevertheless maintained. Apart from this assured pressing, this measure also has the effect of reducing stress peaks, for example as a result of thermal expansion, and consequently lowering the risk of overloading.

BRIEF DESCRIPTION OF THE DRAWINGS

Further advantages and details of the pressing module according to the invention can be taken from the dependent patent claims and the following exemplary embodiment with reference to the drawings, in which:

DETAILED DESCRIPTION OF EXEMPLARY EMBODIMENTS

Figure 1:
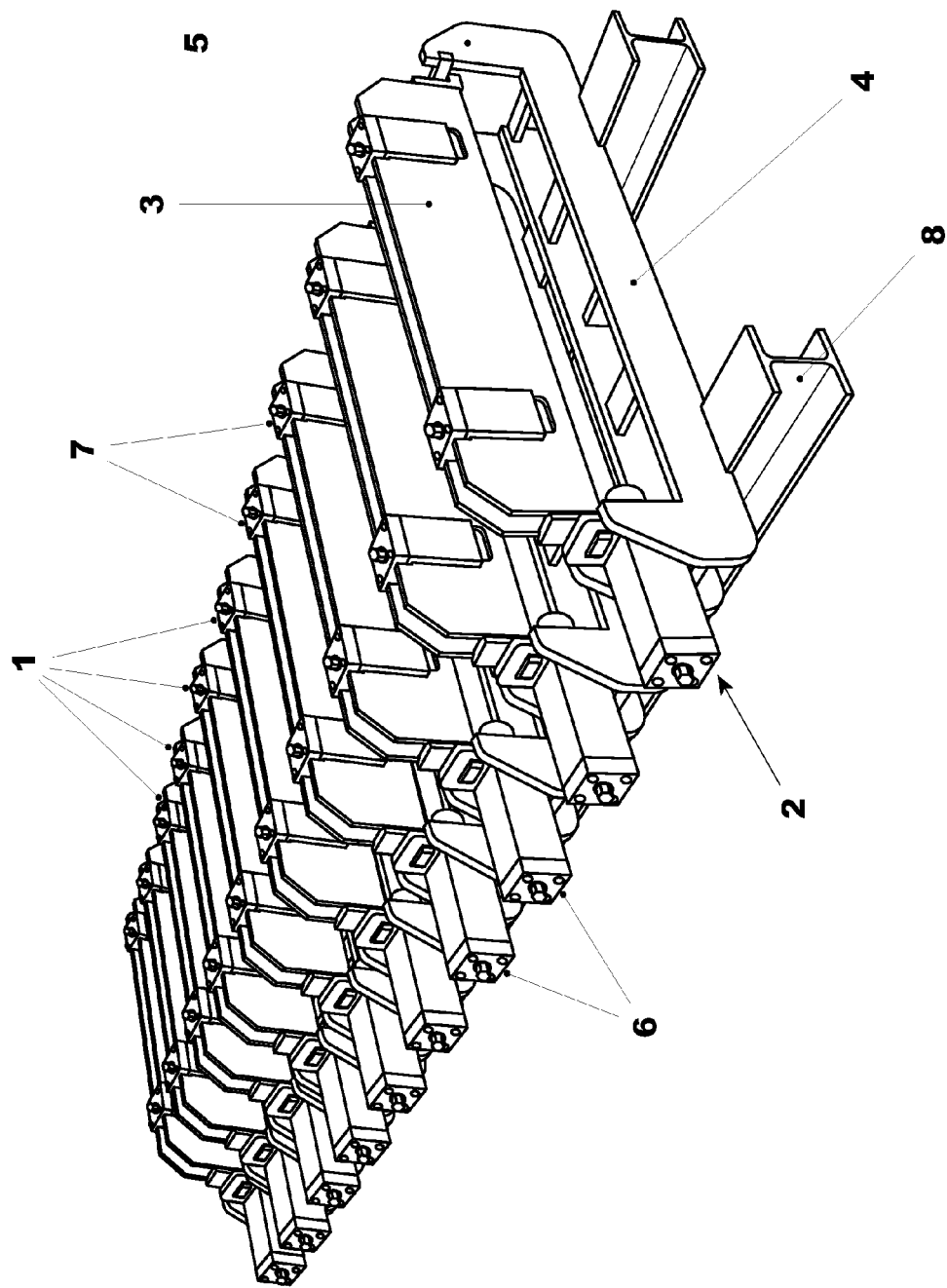
FIG. 1 shows the construction of a pressing apparatus of a modular composition (without inserted conductor bars)

The basic construction of a pressing apparatus for the press-forming of impregnated conductor bars is reproduced in FIG. 1. As the figure clearly illustrates, this pressing apparatus is of a modular construction and is composed of a number of individual pressing modules (1). Each pressing module (1) firstly includes two main component parts, that is to say a first pressing device (2) for introducing a horizontally directed pressing force into the conductor bar and a second pressing device (3) for introducing a vertically directed pressing force. The actual construction is described in more detail in conjunction with FIGS. 3 and 4.

The first-horizontal-pressing device (2) serves for receiving the conductor bars to be pressed into the required form. It includes a framework with a horizontal base (4), which is bounded at both of its ends by webs (5) standing perpendicularly on it. The base (4) and the webs (5) may be cast homogeneously from one piece or be composed of a number of elements that are connected to one another, for example by welding. Because of its form and function, the horizontal pressing device (2) is referred to hereafter as the pressing vat (2). The conductor bars to be pressed, along with the required aids, are placed spaced apart from one another on the base portion (4) bounded by the webs (5), the vat base (12). The pressing vat (2) is designed such that on the one hand it is able to take the weight of the conductor bars and aids and on the other hand it can withstand the tensile and flexural forces introduced by the pressing operation.

As can be seen very clearly from FIG. 1, the closing units (6) for applying the horizontal pressing forces are attached to the lateral webs (5) of the pressing vat (2).

In operative connection with the pressing vat (2) is the vertical pressing device (3), referred to hereafter as the pressing yoke (3). The pressing yoke (3) spans the pressing vat (2). Its task is to introduce the vertical pressing force into the conductor bars. The pressing yoke (3) is fixedly mounted on the pressing vat (2). It is equipped with at least one vertically acting closing unit (7).

In the interests of uniform introduction of pressing force, it has proven to be favorable to arrange two closing units (7) on the pressing yoke (3). In the interests of easy accessibility for the operating personnel, these units are attached as far to the outside as possible on both sides.

For operational use, a number of modules (1), each including a pressing vat (2) and a pressing yoke (3), are put together to form a pressing apparatus. The number of modules to be combined depends on the length of the conductor bars to be treated. It is usual for there to be 5 to 15 modules, which are set up with a distance of 250 mm to 400 mm (measured center to center), preferably approximately 300 mm, between adjacent modules. The embodiment in FIG. 1 shows a pressing apparatus composed of ten modules (1).

Figure 2:
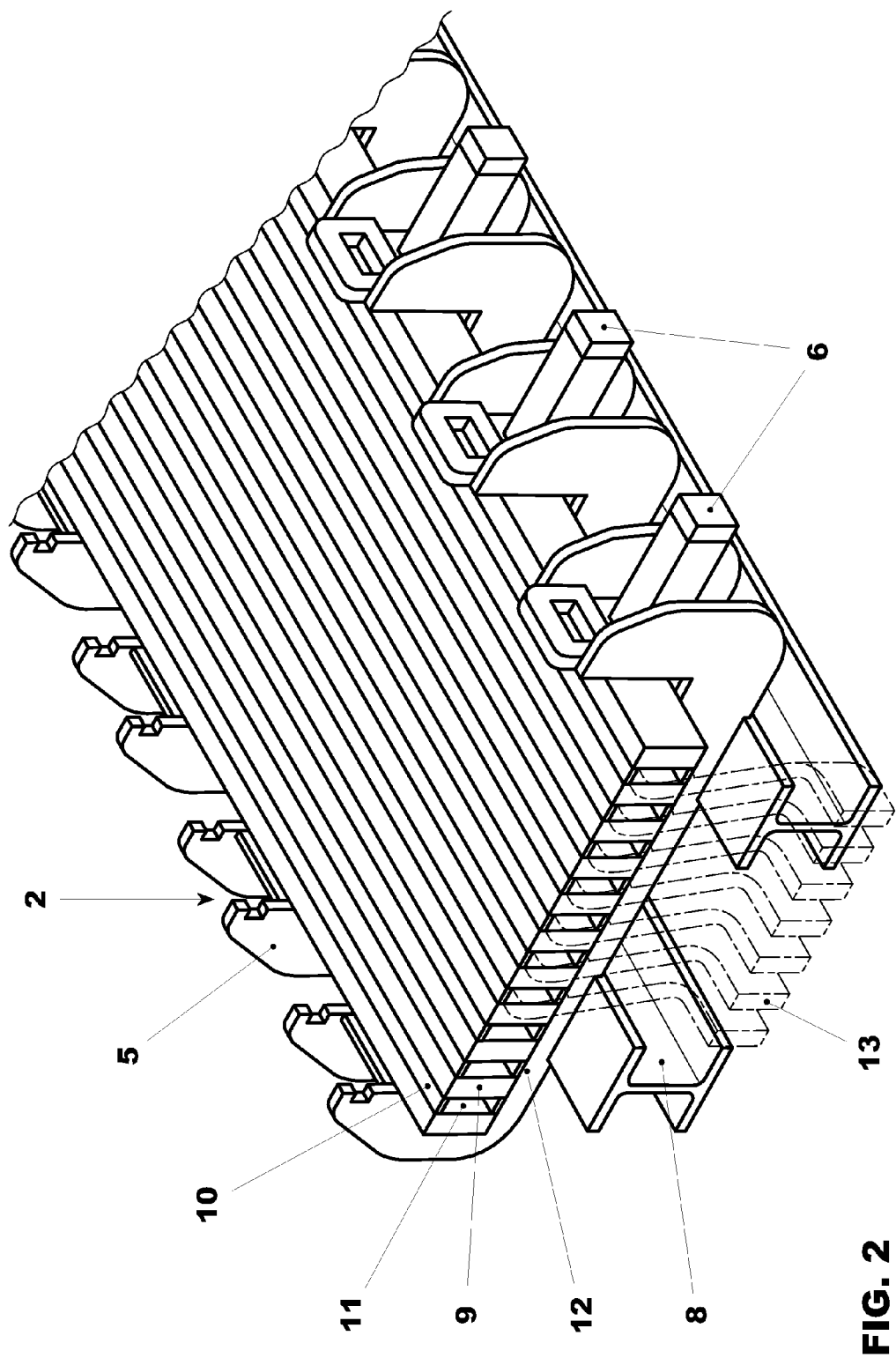
FIG. 2 shows the pressing apparatus with inserted spacing bars and blocks.

It can be seen from the perspective view of FIG. 2 how the conductor bars (13) are arranged in the pressing apparatus. The pressing modules (1) are put together on a preferably transportable support structure (8) to form a pressing apparatus for impregnated conductor bars (13). For the sake of a better overview, this representation is confined to reproducing the pressing vats (2). The pressing yokes (3) have been omitted. Spacing bars (9) lie parallel to and at a distance from one another on the vat base (12) of the pressing vat (2). Between the spaced-apart spacing bars (9) there are spacing blocks (10), the width of which corresponds to the desired width of the conductor bars (13) to be pressed into the required form. The cavity (11) enclosed by the spacing bars (9) and spacing blocks (10) receives the conductor bars (13). It corresponds in its dimensions to the desired cross section of the conductor bar (13).

Therefore, spacing bars (9) and spacing blocks (10) of dimensions adapted in accordance with the dimensions of the conductor bars (13) should be kept. Each conductor bar configuration requires specially adapted dimensioning of these aids (9, 10).

During the operational use of the pressing apparatus, the horizontal closing devices (6) introduce the pressing force into the conductor bars (13) via the spacing bars (9), while the vertical closing devices (7) of the pressing yoke (3) subject the spacing blocks (10) to a pressing force.

Figure 3:
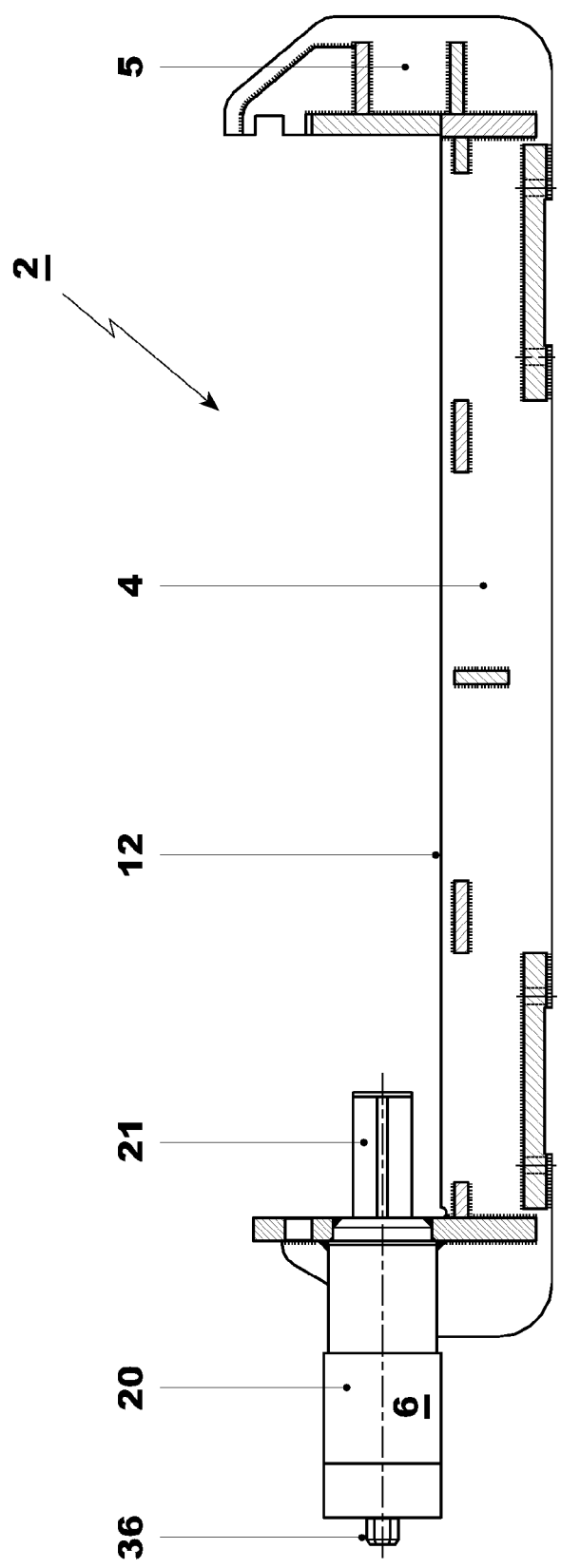
FIG. 3 shows the construction of the horizontal pressing device.

In FIG. 3, a pressing vat (2) is represented in cross section. The main components of the pressing vat (2) are a U-shaped framework with a horizontal base portion (4), the ends of which are bounded by two webs (5) standing perpendicularly on it. One of the webs (5) receives the closing unit (6) for applying the horizontal pressing force. The figure depicts the housing (20) of the closing unit (6) with the pressing piston (21), which during the operation of the pressing module (1) acts on the conductor bars (13) via the spacing bars (9) resting on the vat base (12).

The housing (20) is fixedly connected to the web (5), preferably by a welded connection. The considerable forces that are introduced into the system by the closing unit (6) must be taken into consideration for the design of the frame of the pressing vat (2).

Figure 4A:
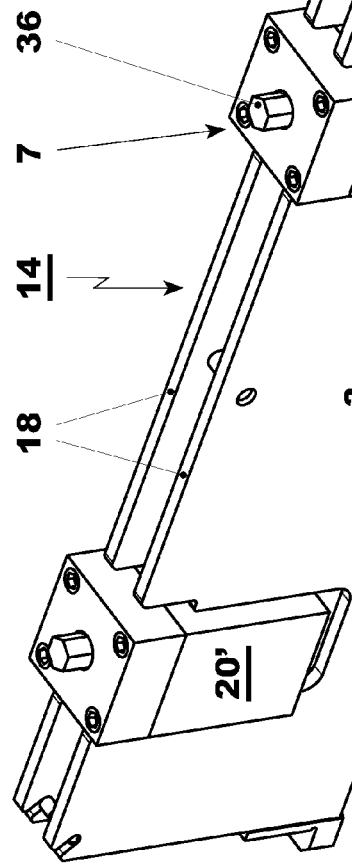
FIGS. 4a, b and c show the construction of the vertical pressing device.
Figure 4B:
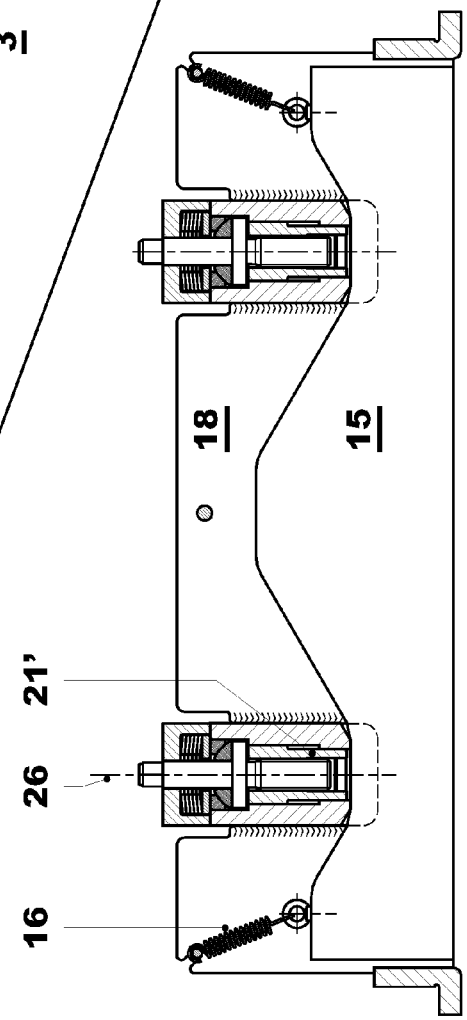
Figure 4C:
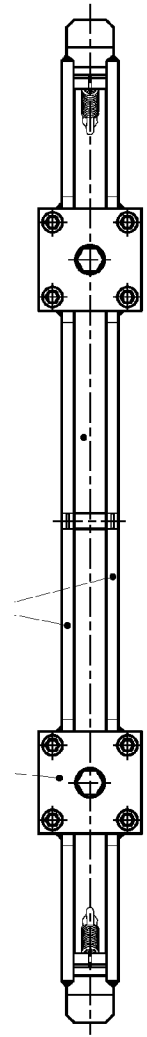

The pressing vat (2) is spanned in its entire width by the pressing yoke (3), the details of which can be seen in FIGS. 4a, 4b and 4c. Two yoke plates (18), arranged spaced apart from each other, form the yoke (14). Within the intermediate space formed by the spaced-apart yoke plates (18), a pressing beam (15) is movably suspended on tension springs (16) in such a way that, when it is subjected to a corresponding force, it can emerge from the yoke (14) downwardly, counter to the action of the springs. When the acting force subsides, the tension springs (16) pull the pressing beam (15) back into the yoke (14) again.

Two housings (20') of the closing unit (7) are welded to the yoke plates (18) in the respectively outer third. An axially displaceable pressing piston (21') protrudes along a vertically extending longitudinal axis (26) of the housing (20') into the intermediate space formed by the yoke plates (18). Extending the pressing piston (21') has the effect that the pressing beam (15) is subjected to a force and slides downward in the direction of the pressing vat (2), counter to the action of the tension springs (16).

When the pressing module (1) is used, the vat (2) is loaded with conductor bars (13) to be pressed. As already described in conjunction with FIG. 2, spacing bars (9) and spacing blocks (10), which are adapted in their dimensions to the dimension of the finished conductor bars (13), are used as aids for the press-forming of the conductor bars (13). Alternating with the conductor bars (13), spacing bars (9) are deposited on the vat base (4) for laterally bounding the conductor bars (13), while the spacing blocks (10) bound the conductor bars (13) underneath and on top. Consequently, the spacing bars (9) determine the dimension of the bar height, while the spacing blocks (10) establish the bar width. Via the spacing blocks (10), the pressing beam (15), acted upon by the pressing piston (21'), applies the vertical pressing force to the conductor bars (13).

To be able to take the forces introduced by the closing unit (7), an adequate connection of the supporting structure of the pressing yoke (3) to the pressing vat (2) is required. For this purpose, angle elements (17) are attached to the outer edges of the yoke plates (18) for the positive connection of the pressing yoke (3) and the pressing vat (2). The outwardly angled-away legs of the angle elements (17) engage in adapted clearances on the webs (5). By being welded to the spaced-apart yoke plates (18), the angle elements (17) at the same time make a contribution to the mechanical integrity of the yoke (14).

Figure 5A:
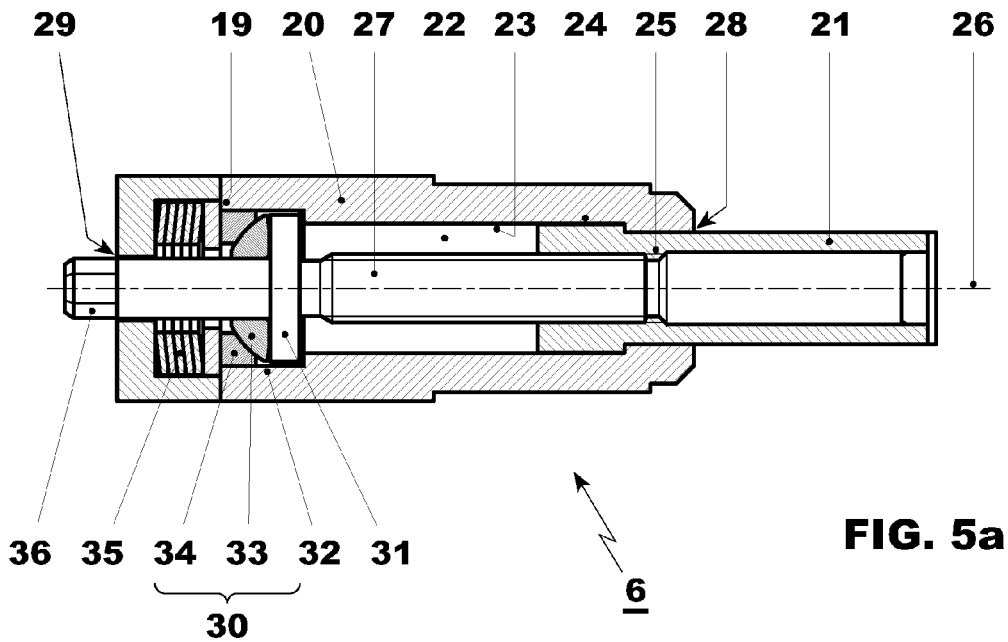
FIGS. 5a and b show a closing unit for applying the pressing force in longitudinal section.
Figure 5B:
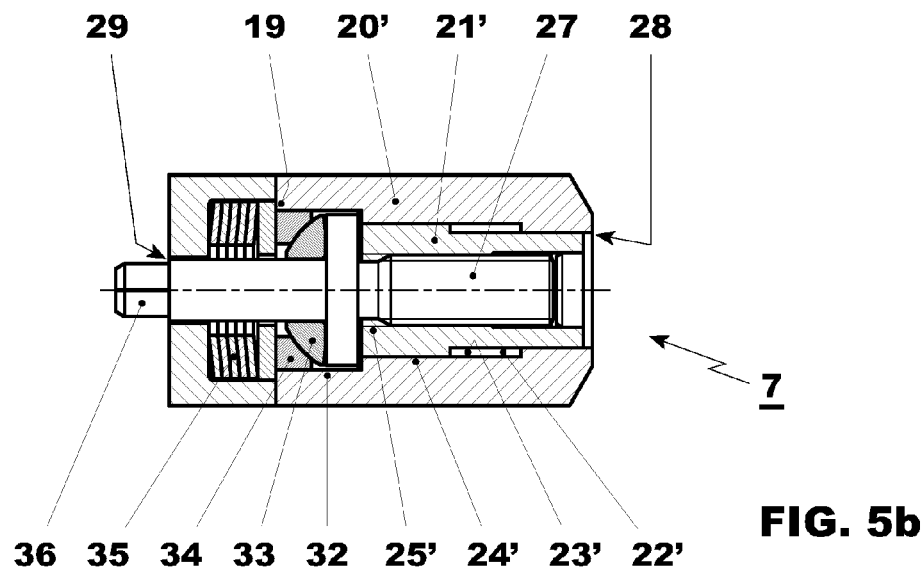

The construction of a closing unit (6) or (7) can be taken from FIG. 5a or 5b. Via the housing (20, 20'), the closing unit (6, 7) is connected to the respective frame element of the pressing module (1), that is to say the web (5) of the pressing vat (2) in the case of the horizontally acting closing unit (6) and the yolk plates (18) of the pressing yolk (3) in the case of the vertically acting closing unit (7).

The housing (20, 20') encloses an inner cavity (22, 22') with an inner contour (23, 23') and a center axis (26). At both its longitudinal ends, the cavity (22, 22') undergoes a cross-sectional reduction and forms on the center axis (26) a respective through-opening (28) and (29) through the front and rear end faces of the housing (20, 20').

A pressing piston (21, 21') is slidingly mounted in the cavity (22, 22'), the outer contour (24, 24') of the pressing piston (21, 21') being in frictional contact with the inner housing contour (23, 23'). Via the through-opening (28), the pressing piston (21, 21') can be extended out of the housing (20, 20').

The abrupt change in cross section at the transition from the cavity (22, 22') to the through-opening (28) serves at the same time as a stop for limiting the extending distance. This prevents unintentional unscrewing or falling out of the pressing piston (21, 21').

The pressing piston (21, 21') has, in the region of the center axis (26), a threaded hole (25, 25'). This may be a through-hole. However, in the interests of a reduced risk of dirt ingress, preference is given to a configuration of the threaded hole (25, 25') as a blind hole. In any case, it must be ensured that the length of the thread of the threaded hole (25, 25') corresponds at least to the extending distance of the pressing piston (21, 21') that is to be provided.

The pressing piston (21, 21') is in operative connection with a threaded bolt (27, 27'), which is mounted rotationally movably in the housing (20, 20'). Its axis of rotation lies on the center axis (26). On its front part, located within the housing (20, 20'), it is provided with a thread, for example a trapezoidal thread, with the aid of which it can be screwed into the threaded hole (25, 25') of the pressing piston (21, 21'). In the screwed-in state, the threaded bolt (27, 27') is consequently also radially fixed at its front end, that is to say that the pressing piston (21, 21') consequently acts at the same time as a radial bearing for the threaded bolt (27, 27').

The opposite end of the threaded bolt (27, 27') penetrates through the second through-opening (29) and protrudes out of the rear end face of the housing (20, 20'). In this region, the threaded bolt (27, 27') is provided with a contour (36) for receiving a torque wrench, a pneumatic screwdriver or a comparable tool for applying a turning movement. Numerous forms come into consideration here, such as an external hexagon or square, an internal hexagon, etc.

In order that a turning movement of the threaded bolt (27, 27') screwed into the pressing piston (21, 21') is converted into an axial movement of the pressing piston (21, 21'), the latter must be prevented from turning with the bolt. This can take place in various ways. One alternative is to give the inner contour (23, 23') of the housing cavity (22, 22') and the outer contour (24, 24') of the pressing piston (21, 21') a cross-sectional shape other than a circular shape, for example a rectangular shape.

Alternatively, in the case of a piston (21, 21') of a circular configuration, the contour of the cavity (22, 22') or the through-opening (28, 28') may be provided with a longitudinally running groove, into which there engages a projection of a complementary form on the piston contour (24, 24')—or vice versa.

For axial fixing, the threaded bolt (27, 27') is supported in its rear region in an axial bearing (30). One component of the bolt includes a disk-like cross-sectional widening (31), which runs around in a recess (32) of the inner housing contour (23, 23'). Such an axial bearing of a very simple design readily satisfies the requirements for axial fixing of the threaded bolt (27, 27') in the effective direction of the pressing force. In the opposite direction, however, the axial bearing (30) must take the pressing force that is introduced into the conductor bars to be press-formed, which may be up to 150 kN. Such stresses require an adequate design of the axial bearing (30). A self-centering axial sliding bearing, in which a spherically formed supporting contour (33) of the disk (31) slides with friction in a bearing bush (34) of a complementary form, has been successfully used for this. A material to use for these two bearing components (33) and (34) is a bronze alloy together with a PTFE coating.

In addition, the axial bearing (30) performs the function of a radial guide of the threaded bolt (27, 27) and consequently acts at the same time as a second radial bearing thereof.

Practical experience with conventional pressing apparatuses has shown that, if there is any drop in the pressing pressure, for instance as a result of improper handling of the closing devices, air is sucked into the impregnated conductor bar insulation, with the consequence of reducing the quality of the end product or even its usability. In order to overcome this problem, it has proven to be advantageous to mount the pressing piston (21, 21') flexibly. This desired effect is brought about according to principles of the present invention by an expedient configuration of the axial bearing (30) of the threaded bolt (27, 27'). Thus, the axial bearing bush (34) is not rigidly fixed, but mounted in a sliding manner within the recess (32). In this case, it is supported on a cup spring assembly (35). When there is loading of the pressing piston (21, 21'), the bearing bush (34) slides toward the spring assembly (35) by a spring deflection $\Delta$, depending on the force that is introduced by the pressing piston (21, 21') and the design of the spring assembly (35). If the loading of the pressing piston (21, 21') subsides, it extends again by at most this spring deflection $\Delta$. In this way, when there is shrinkage of the conductor insulation, the pressing force is maintained even without active readjustment of the pressing piston (21, 21'). The probability of air pockets occurring in the insulation is thereby reduced significantly.

A stop (19) limits the spring deflection and keeps the spring assembly (35) under prestress.

The closing units (6) and (7) on the pressing vat (2) and on the pressing yoke (3) are based in principle on the same type of construction. It may merely be advisable to provide certain modifications with regard to different extending distances of the pressing pistons (21, 21'), which is primarily reflected in the dimensioning of the components involved.

Since the horizontal closing unit (6) acts on a multiplicity of conductor bars arranged one behind the other—seen in the direction of effect of the pressing force—for example ten conductor bars, the extending distance to be covered by the horizontal pressing piston (21) results from the sum of the shrinkage values to be compensated of the, for example ten, conductor bars to be acted upon within one working cycle. By contrast, the pressing beam (15) of the pressing yoke (3) acts only on "one layer" of conductor bars. As a consequence, therefore, a much longer extending distance is required for the horizontal closing unit (6) than for the vertical closing unit (7). Allowance can be made for this fact by a modified construction of the closing units (6) and (7). The primed reference numerals indicate differently designed components.

FIG. 5b depicts a version of a closing unit (7) with a shortened extending distance of the pressing piston (21'), as preferably used for the vertical closing unit (7).

While the representation according to FIG. 5a reproduces the pressing piston (21) in the fully extended state, FIG. 5b shows a retracted pressing piston (21').

LIST OF DESIGNATIONS

1 Pressing module
2 Pressing vat
3 Pressing yoke
4 Base portion of the pressing vat (2)

5 Side webs of the pressing vat (2)
6 Closing unit for applying the horizontal pressing forces
7 Closing unit for applying the vertical pressing forces
8 Support
9 Spacing bars
10 Spacing blocks
11 Cavity for receiving the conductor bars
12 Vat base
13 Conductor bar
14 Yoke
15 Pressing beam
16 Tension spring
17 Angle element
18 Yoke plate
19 Stop for the spring assembly (35)
20 Housing
21 Pressing piston
22 Cavity in the housing (20)
23 Inner contour of the cavity (22)
24 Outer contour of the piston (21)
25 Threaded hole
26 Center axis
27 Threaded bolt
28 Through-opening in (20) for (21)
29 Through-opening in (20) for (27)
30 Axial bearing
31 Cross-sectional widening on (27)
32 Recess in (22)
33 Supporting contour
34 Bearing bush
35 Cup spring assembly
36 Contour for receiving a tool, for example a hexagon While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

We claim:

1. A pressing module for a pressing apparatus for the press-forming of impregnated conductor bars for large electrical machines, the module comprising:
a first pressing device including a framework in the form of a vat, the framework having a horizontal base portion and two outer webs extending perpendicularly up from the horizontal base portion, and at least one first closing unit configured and arranged to apply a pressing force to at least one impregnated conductor bar when resting on the base portion;
a second pressing device including a yoke spanning the first pressing device, and at least one second closing unit configured and arranged to apply a pressing force to the at least one impregnated conductor bar when resting on the base portion, wherein directions of pressing forces exerted on the at least one conductor bar by the first pressing device and the second pressing device are perpendicular to one another;
wherein at least one of the first and second closing units comprises a housing which encloses a cavity with an inner contour and includes a through-opening, and a pressing piston having an outer contour slidingly mounted on the inner contour by the outer contour;
wherein the pressing piston has a center axis and a threaded hole at the center axis; and
an axially fixed, threaded bolt arranged rotationally movably within the housing and cooperating with the pressing piston threaded hole in such a way that a turning movement of the threaded bolt causes axial movement of the pressing piston, and the pressing piston can be extended out of the housing through said housing through-opening.

2. The pressing module as claimed in claim 1, wherein the pressing piston of the first closing unit is oriented to produce a substantially horizontal direction of force and the pressing piston of the second closing unit is oriented to produce a substantially vertical direction of force.

3. The pressing module as claimed in claim 2, wherein:
the first pressing device is a pressing vat and the second pressing device is a pressing yoke; and
the pressing yoke and the pressing vat are releasably connected to each other.

4. The pressing module as claimed in claim 3, wherein:
the first pressing device is a pressing vat and the second pressing device is a pressing yoke; and
the pressing yoke and the pressing vat are positively connected to each other.

5. The pressing module as claimed in claim 1, wherein the yoke comprises:
two yoke plates spaced apart from each other; and
a pressing beam movably suspended between the two yoke plates.

6. The pressing module as claimed in claim 5, wherein:
the yoke further comprises tension springs; and
the pressing beam is suspended by the yoke tension springs.

7. The pressing module as claimed in claim 5, wherein:
the housing is fixedly connected to the two yoke plates; and
the pressing piston is configured and arranged to act on the pressing beam between the two yoke plates.

8. The pressing module as claimed in claim 7, wherein:
the at least one second closing unit comprises two second closing units; and
the yoke comprises the two second closing units; and
the two second closing units are each arranged in an outer third of the yoke.

9. The pressing module as claimed in claim 5, further comprising:
angle elements arranged on outer edges of the two yoke plates, configured and arranged to positively connect the first pressing device and the second pressing device.

10. The pressing module as claimed in claim 1, wherein the housing of the at least one closing unit is fixedly connected to one of the webs of the first pressing device.

11. The pressing module as claimed in claim 1, wherein:
the housing has a rear wall including a through-opening through which through-opening one end of the threaded bolt protrudes out of the housing; and
said one end of the threaded bolt comprises a contour configured and arranged to transmit torque.

12. The pressing module as claimed in claim 11, wherein the contour of said one end of the threaded bolt is an external hexagon.

13. The pressing module as claimed in claim 1, wherein:
the housing inner contour comprises a recess; and
the threaded bolt comprises a disk-like cross-sectional widening which extends in the recess of the housing inner contour.

14. The pressing module as claimed in claim 13, wherein:
the at least one of the first and second closing units further comprises an axial bearing bush including a recess; and
the disk-like cross-sectional widening comprises, on a side facing away from the pressing piston, a spherical supporting contour which is complementary to and interacts with the axial bearing bush recess.

15. The pressing module as claimed in claim 14, wherein the axial bearing bush is flexibly mounted in the at least one of the first and second closing units.

16. The pressing module as claimed in claim 15, wherein:
the housing comprises a cup spring assembly; and
the axial bearing bush is supported on the cup spring assembly within the housing.

17. The pressing module as claimed in claim 14, wherein the axial bearing bush and the supporting contour are formed of a bronze alloy.

18. A pressing apparatus for the press-forming of impregnated conductor bars for large electrical machines, the pressing apparatus comprising:
at least two pressing modules as claimed in claim 1.

19. The pressing apparatus as claimed in claim 18, wherein the at least two pressing modules are arranged in line with a distance between them, and further comprising:
spacing bars and spacing blocks resting on the horizontal base portion of the at least two pressing modules, wherein the spacing bars and the spacing blocks are mutually arranged to bound a rectangular cavity for receiving a preformed impregnated conductor bar;
wherein the spacing bars are configured and arranged to cover wide sides of the conductor bars and the spacing blocks are configured and arranged to cover narrow sides of the conductor bars;
wherein the first closing units are configured and arranged to exert a horizontal pressing force on the spacing bars; and
wherein the second closing units are configured and arranged to exert a vertical pressing force on the spacing bars.

20. The pressing apparatus as claimed in claim 18, wherein the at least two pressing modules comprises between five to fifteen pressing modules assembled together.

21. The pressing apparatus as claimed in claim 18, wherein the at least two pressing modules comprises between eight to twelve pressing modules assembled together.

22. The pressing apparatus as claimed in claim 18, wherein the at least two pressing modules comprises ten pressing modules assembled together.

23. The pressing apparatus as claimed in claim 18, wherein a distance between adjacent pressing modules is 250 mm to 400 mm.

24. The pressing apparatus as claimed in claim 18, wherein a distance between adjacent pressing modules is approximately 300 mm.

* * * * *